United States Patent
Mevius

(10) Patent No.: US 9,662,752 B2
(45) Date of Patent: May 30, 2017

(54) METHOD AND APPARATUS FOR DAMPING AN ACTUATOR ON A FLUID REGULATOR

(71) Applicant: EMERSON PROCESS MANAGEMENT REGULATOR TECHNOLOGIES, INC., McKinney, TX (US)

(72) Inventor: Jason S. Mevius, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 14/953,603

(22) Filed: Nov. 30, 2015

(65) Prior Publication Data

US 2016/0074975 A1    Mar. 17, 2016

Related U.S. Application Data

(62) Division of application No. 13/618,275, filed on Sep. 14, 2012, now Pat. No. 9,234,599.

(51) Int. Cl.
    *G05D 16/02*    (2006.01)
    *B23P 6/00*     (2006.01)
    (Continued)

(52) U.S. Cl.
    CPC ............... *B23P 6/00* (2013.01); *F16K 17/10* (2013.01); *G05D 16/02* (2013.01);
    (Continued)

(58) Field of Classification Search
    CPC .......... Y10T 137/0497; Y10T 137/782; Y10T 137/7831; Y10T 137/7922–137/7939; Y10T 137/7781; Y10T 137/7856; Y10T 29/49716; G05D 16/02; G05D 16/0675; B23P 6/00; F16K 17/10
    (Continued)

(56) References Cited

U.S. PATENT DOCUMENTS

| 1,305,964 A | | 6/1919 | Dickson |
| 1,490,654 A | * | 4/1924 | Wylie ................. G05D 7/0106 137/501 |

(Continued)

FOREIGN PATENT DOCUMENTS

| DE | 9005824 U1 | 7/1990 |
| WO | WO-9631285 A1 | 10/1996 |

OTHER PUBLICATIONS

Search Report for PCT/US2013/059354, mailed Dec. 6, 2013.
(Continued)

*Primary Examiner* — William McCalister
(74) *Attorney, Agent, or Firm* — Marshall, Gerstein & Borun LLP

(57) ABSTRACT

A damped actuator for a fluid regulator includes a diaphragm disposed in a housing, and a damper arranged to stabilize movement of the diaphragm in response to changes in pressure inside the housing. The damper includes a ball check valve arranged to allow air to exhaust out of the housing when above a preselected pressure. The damper may include interchangeable components so as to be modifiable to have different set point pressures to achieve different backpressures inside the housing.

12 Claims, 3 Drawing Sheets

(51) Int. Cl.
  *F16K 17/10* (2006.01)
  *G05D 16/06* (2006.01)

(52) U.S. Cl.
  CPC .... *G05D 16/0683* (2013.01); *Y10T 29/49716* (2015.01); *Y10T 137/7781* (2015.04); *Y10T 137/782* (2015.04); *Y10T 137/7831* (2015.04); *Y10T 137/7856* (2015.04); *Y10T 137/7927* (2015.04); *Y10T 137/7936* (2015.04)

(58) Field of Classification Search
  USPC ............... 137/505.11, 505.47, 539–543.23
  See application file for complete search history.

(56) References Cited

U.S. PATENT DOCUMENTS

| | | | | |
|---|---|---|---|---|
| 1,697,324 A * | 1/1929 | Morse | ............ | F16N 21/04 137/454.6 |
| 2,081,860 A * | 5/1937 | Rays | ............ | F04D 15/00 137/115.05 |
| 2,156,823 A * | 5/1939 | Stettner | ............ | G05D 16/0663 137/505.11 |
| 2,324,579 A * | 7/1943 | Hart | ............ | G05D 16/185 137/488 |
| 2,477,897 A * | 8/1949 | Ray | ............ | F23N 5/067 236/1 E |
| 2,481,713 A * | 9/1949 | Bertea | ............ | F16K 15/044 137/515.5 |
| 2,526,972 A * | 10/1950 | Ray | ............ | G05D 23/185 137/505.13 |
| 2,793,075 A * | 5/1957 | Gulick, Jr. | ............ | F16K 17/042 137/505.11 |
| 2,819,728 A * | 1/1958 | Gage | ............ | G05D 7/0106 137/505.11 |
| 2,877,791 A * | 3/1959 | Rich | ............ | F16K 7/17 137/188 |
| 2,965,128 A * | 12/1960 | Silver | ............ | F16K 17/34 137/492 |
| 2,971,537 A * | 2/1961 | Kowalski | ............ | G05D 16/10 137/116.5 |
| 3,053,448 A * | 9/1962 | Au Werter | ............ | G05D 7/005 137/492.5 |
| 3,122,318 A * | 2/1964 | Null | ............ | F24F 3/0522 137/492.5 |
| 3,153,424 A * | 10/1964 | Acker | ............ | G05D 16/0663 137/484.8 |
| 3,181,040 A * | 4/1965 | Viale | ............ | H01F 7/1623 137/505.11 |
| 3,207,175 A * | 9/1965 | Pauly | ............ | G05D 16/0694 137/116.5 |
| 3,259,274 A * | 7/1966 | Klasson | ............ | B67D 1/0412 137/505.11 |
| 3,308,846 A * | 3/1967 | Yuile | ............ | F16K 17/105 137/487.5 |
| 3,335,750 A * | 8/1967 | Kepner | ............ | F16K 15/044 137/515.5 |
| 3,343,564 A * | 9/1967 | Peeples | ............ | F16K 15/044 137/539 |
| 3,512,549 A * | 5/1970 | Wiegand | ............ | F16K 17/105 137/489 |
| 3,791,406 A * | 2/1974 | Philipps | ............ | F16K 15/044 137/515.5 |
| 4,004,533 A | 1/1977 | Woolston | | |
| 4,076,041 A * | 2/1978 | Christianson | ............ | A62B 9/027 128/204.26 |
| 4,245,669 A * | 1/1981 | Schmidt | ............ | G05D 7/0106 137/501 |
| 4,671,319 A * | 6/1987 | Namand | ............ | F16K 17/105 137/488 |
| 4,782,850 A * | 11/1988 | Duffy | ............ | G05D 16/0686 137/116.5 |
| 4,850,345 A * | 7/1989 | Jackson | ............ | A62B 9/027 128/202.27 |
| 5,443,186 A * | 8/1995 | Grill | ............ | B67D 1/0412 137/505.11 |
| 6,068,014 A * | 5/2000 | Tomita | ............ | G05D 16/0666 137/116.5 |
| 6,186,168 B1 * | 2/2001 | Schultz | ............ | G05D 16/103 137/505.11 |
| 6,513,545 B2 * | 2/2003 | Rhone | ............ | F16K 17/30 137/460 |
| 7,845,522 B2 * | 12/2010 | Grill | ............ | B67D 1/0406 137/212 |
| 2008/0258098 A1 | 10/2008 | Hawkins et al. | | |
| 2009/0260697 A1 * | 10/2009 | Mevius | ............ | G05D 16/0605 137/484.2 |
| 2010/0071786 A1 * | 3/2010 | Hawkins | ............ | G05D 16/163 137/485 |
| 2014/0076426 A1 * | 3/2014 | Mevius | ............ | F16J 15/062 137/494 |
| 2014/0076427 A1 * | 3/2014 | Mevius | ............ | G05D 16/02 137/494 |
| 2014/0083528 A1 * | 3/2014 | Mevius | ............ | F16K 31/165 137/505 |
| 2014/0090717 A1 * | 4/2014 | Mevius | ............ | G05D 16/10 137/12 |
| 2014/0090719 A1 * | 4/2014 | Mevius | ............ | F16K 17/02 137/15.24 |
| 2014/0090724 A1 * | 4/2014 | Mevius | ............ | F16K 31/165 137/488 |
| 2014/0090727 A1 * | 4/2014 | Nguyen | ............ | G05D 16/0694 137/505.18 |
| 2014/0261724 A1 * | 9/2014 | Fan | ............ | F16K 31/1262 137/15.01 |

OTHER PUBLICATIONS

Written Opinion for PCT/US2013/059354, mailed Dec. 6, 2013.
International Preliminary Report on Patentability for International application No. PCT/US2013/059354, dated Mar. 17, 2015.

* cited by examiner

METHOD AND APPARATUS FOR DAMPING AN ACTUATOR ON A FLUID REGULATOR

CROSS REFERENCE TO RELATED APPLICATIONS

This application is a divisional of U.S. patent application Ser. No. 13/618,275, filed Sep. 14, 2012, the entirety of which is incorporated by reference herein.

FIELD OF THE INVENTION

The present invention relates generally to fluid regulators, and more particularly, to a damper for use on the actuator of a fluid regulator.

BACKGROUND

The pressure at which typical gas distribution systems supply gas may vary according to a number of factors. These factors may include, for example, the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of the end-user appliance. Therefore, process fluid regulators are implemented in these distribution systems in order to ensure that the delivered gas meets the requirements of the end-user facilities. Process fluid regulators are also used to regulate the delivery of liquids to achieve similar functionalities. However, fluid regulators can become unstable and begin to flutter, or rapidly oscillate, undesirably in response to changes in pressure of the process fluid.

FIG. 1 shows a common process fluid regulator 10. The fluid regulator 10 includes a regulator body 12, a control element 14, and an actuator 16. The regulator body 12 defines a fluid flow path 18, a fluid inlet 20, a fluid outlet 22, and an orifice 24. The orifice 24 is operatively disposed between the fluid inlet 20 and the fluid outlet 22. The fluid flow path 18 extends from the fluid inlet 20, through the orifice 24, and to the fluid outlet 22. The control element 14, such as a valve disk or plug, shifts to regulate the flow of fluid along the fluid flow path 18 through the orifice 24. The actuator 16 is operatively connected to the regulator body 12 and the control element 14 to control the position of the control element 14 relative to the orifice 24. The actuator includes an actuator housing 26, a diaphragm 28 disposed inside the housing 26, and an actuator linkage 30 operatively connecting the diaphragm 28 to the control element 14. The diaphragm 28 separates the housing 26 into a first chamber 32 and a second chamber 34. The first chamber 32 is hydraulically connected to the fluid outlet 22, such as by one or more fluid conduits 35 extending from the first chamber 32 to a location in the fluid flow path 18 downstream of the orifice 24, to sense a fluid pressure at the fluid outlet 22. The second chamber 34 is hydraulically connected to the surrounding ambient atmosphere. The linkage 30 includes a lever 36 having a first end operatively connected to the diaphragm 28 and a second end operatively connected to a valve stem 38 operatively connected to the control element 14. Movement of the diaphragm 28 in response to pressure changes at the fluid outlet 22 causes the linkage to shift the valve stem 38, and thereby the control element 14, in a manner to maintain a the process fluid pressure within a preselected range at the fluid outlet 22.

The actuator housing 26 is formed of a first or spring case 40 and a second or diaphragm case 42 secured together, such as with one or more bolts connecting respective outer flanges of the first and second cases 40, 42. The diaphragm 28 has an outer peripheral edge clamped between the outer flanges of the spring case 40 and the diaphragm case 42. The first chamber 32 is defined at least partly by the diaphragm 28 and the diaphragm case 42. The second chamber 34 is defined at least partly by the spring case 40 and the diaphragm.

A first or exhaust vent 44 is formed in the spring case 40 of the housing 26 and extends into the second chamber 34. The exhaust vent 44 includes a bore 46 extending from an inlet 48 to an outlet 59. The bore 46 is defined by a sleeve 50 extending along an outer surface of the spring case 40. The inlet 48 is defined by a first orifice through the spring case 40. The outlet 49 is defined by a distal end of the sleeve 50. The exhaust vent 44 hydraulically connects the second chamber 34 to the surrounding ambient atmosphere to allow the second chamber 34 to be maintained at approximately the same pressure as the surrounding ambient atmosphere.

A stabilizer valve 52 in the form of a normally-closed check valve is disposed in the exhaust vent 44. The stabilizer valve 52 is disposed at the inlet 48 and includes a stabilizer, such as a seal disk 54, a stabilizer guide, such as a rod 56, and a spring 58. The rod 56 depends from the inner surface of the sleeve 50 and extends through an aperture through the seal disk 54. The seal disk 54 is slidingly disposed on the rod 56. The spring 58 seats against the inner surface of the sleeve 50 and the seal disk 54 and biases the seal disk 54 into sealing engagement with an outer periphery of the inlet 48. The seal disk 54 slides up along the rod 56 and compresses the spring 58 when air pressure inside the second chamber 34 exceeds a set point force of the spring 58.

The stabilizer valve 52 stabilizes movement of the diaphragm 28 and the control element 14 in response to rapid changes in the outlet fluid pressure at the fluid outlet 22. For example, without the stabilizer valve 52, rapid changes in the outlet fluid pressure may cause undesirable oscillation, or flutter, of the diaphragm 28 and the control element 14. The stabilizer valve 52 helps to reduce such oscillations by limiting exhausting of air through the exhaust vent 44 until the air inside the second chamber 34 reaches a minimum backpressure sufficient to overcome the bias force of the spring 58.

It may sometimes be desirable to adjust a set point pressure or backpressure setting of the stabilizer valve 52. In the present arrangement, it may be difficult to adjust the backpressure setting without disassembling the spring case 40 from the diaphragm case 42 in order to access the various components of the stabilizer valve 52. This may require complete shutdown of the process line being controlled by the fluid regulator 10, which may be undesirable at a time that the backpressure setting needs to be adjusted.

A second or control vent 68 is formed in the diaphragm case 42 of the housing 26 and extends into the first chamber 32. The control vent 68 includes an aperture 70 through the diaphragm case 42 and a socket 72. The socket 72 is defined by sleeve 74 on the outer surface of the diaphragm case 42. Preferably, the sleeve 74 is an integral portion of the diaphragm case 42. The sleeve 74 has a first end surrounding the aperture 70, a second end spaced distal from the aperture, and interior threads 76 adjacent the second end. Fluid, such as air or liquid, from inside the first chamber 32 may pass through the aperture 70 and the socket 72. In some applications, the control vent 68 is closed, such as with a plug (not shown) threadedely engaged into the socket 72 at the interior threads 76 at the second end of the sleeve. In other applications, the control vent 68 is operatively connected to a process line, for example, by a conduit 78 operatively connecting the sleeve 74 to a process pipe (not shown) operatively connected to the fluid outlet 22. In this arrangement fluid pressure inside the first chamber 32 can equalize with fluid pressure at a downstream point in the process pipe through the aperture 70 and the conduit 78.

SUMMARY

According to some aspects of the disclosure, an actuator for a fluid regulator includes a diaphragm disposed in a housing, and a damper arranged to stabilize movement of the diaphragm in response to changes in pressure inside the housing. The damper includes a ball check valve arranged to allow air to exhaust out of the housing when above a preselected pressure.

In one exemplary aspect, a damped actuator for use with a fluid regulator includes an actuator housing, a diaphragm, an actuator linkage, a vent opening, and a damper operatively coupled to the vent opening. The diaphragm is disposed in the actuator housing and separates the actuator housing into a first chamber and a second chamber. The actuator linkage is operatively connected to the diaphragm and arranged to be operatively connected to a valve stem and to shift the valve stem between a first position and a second position. The vent opening is formed in the actuator housing and extends into at least one of the first chamber and the second chamber. The damper includes a sleeve, a valve seat, a ball, and a spring. The sleeve is operatively coupled to the vent opening and includes a bore. The valve seat is disposed within the bore. The ball is shiftably disposed in the bore and arranged to shift from a closed position seated against the valve seat to an open position disposed away from the valve seat. The spring is positioned to bias the ball toward the valve seat and arranged to allow the ball to shift to the open position when fluid pressure within the selected chamber exceeds a threshold pressure to thereby vent fluid pressure from the selected chamber.

According to another exemplary aspect, a fluid regulator includes a regulator body, a control element, and the actuator of the present disclosure. The actuator is preferably operatively connected to the regulator body and the control element to control fluid flow through the regulator body.

According to a further exemplary aspect, a method of modifying an actuator for a fluid regulator is disclosed. The actuator includes an actuator housing, a diaphragm, a linkage, and a vent opening formed in the actuator housing. The diaphragm is disposed in the actuator housing and separates the actuator housing into a first chamber and a second chamber. The linkage is operatively connected to the diaphragm and arranged to be operatively connected to a valve stem. The vent defines an air exhaust path out of at least one of the first and second chambers. The method includes steps of providing a damper including a ball check valve, and operatively securing the damper to the vent so as to control flow of air exhausted though the vent.

In further accordance with any one or more of the exemplary aspects, a pressure regulator, actuator, damper, and/or system of this disclosure optionally may include any one or more of the following further preferred forms.

In some preferred forms, the damper includes a control element in the form of a ball, a valve seat, a spring, and a spring seat. The sleeve may define an inlet, an outlet, and a bore extending from the inlet to the outlet. The valve seat may be disposed in the bore, preferably near the inlet. The spring seat may be disposed in the bore spaced apart from the valve seat toward the outlet. The ball is disposed in the bore and engages the valve seat. The spring may be disposed in the bore between the ball and the spring seat and may engage the ball and the spring seat. The spring may bias the ball against the valve seat in a closed position and allow the ball to separate from the valve seat in response to an increase in air pressure at the inlet in an open position. In the open position, air can travel from the inlet to the outlet, thereby exhausting air from the respective first and/or second chamber. The spring may be a coil spring having a first end and a second end. The first end of the spring may be operatively engaged with the ball, such as by being seated against the ball. A second end of the coil spring may be operatively engaged with the spring seat, such as by being seated against the spring seat.

In a still further exemplary aspect, a system for customizing the damper is disclosed in which one or more of the ball, the valve seat, the spring, and the spring seat is/are interchangeable to allow customization of the damper. Any one of two or more different sized valve seats may be selectively coupled to the sleeve, such as by being secured in the outlet of the bore. Each of the different size valve seats may have a first plug body that fits into the bore. The first size valve seat may have a bleed aperture of a first size, and the second size valve seat may have a bleed aperture of a second size. Any one of two or more different sized spring seats may be selectively coupled to the sleeve, such as by being secured in the bore. Each of the different size spring seats may have a second plug body that fits into the bore. The first size spring seat may have a bleed aperture of a first size, and the second size spring seat may have a bleed aperture of a second size. Any one of two or more different sized springs may be selectively operatively disposed to bias the ball. Any one of two or more different sized balls may be selectively operatively disposed in the bore. In this way, the damper may be customized to have any one of several different possible characteristics, such as different backpressure set points and/or flow rate capacity.

In some preferred forms, the vent extends into the first chamber through the housing. The vent may be in the form of a port for connection to a control line to a process line extending from the fluid outlet of the regulator.

In some preferred forms, the vent extends into the second chamber through the housing. The vent may define a second inlet, a second outlet, and a second bore extending from the second inlet to the second outlet. The actuator further may include a relief valve disposed in the vent. The relief valve may be disposed in the second bore. The sleeve of the damper may be disposed in the second bore. The relief valve may be disposed at the second inlet. The damper may be disposed at the second outlet. The vent may extend from the second chamber to atmosphere.

In some preferred forms, a protective cover is disposed across the outlet of the damper. The protective cover may include a neck and shield. The neck may fit into the outlet of the damper. The neck may have outer threads that engage inner threads of the outlet. The neck may be removably secured in the outlet, for example by a threaded connection. The shield may be spaced from the outlet when the neck is operatively disposed in the outlet. One or more air flow passageways may extend through the neck to allow air to exhaust from the outlet.

In some preferred forms, the regulator body defines a fluid inlet, a fluid outlet, and a fluid flow path extending from the fluid inlet to the fluid outlet. The control element may be arranged to shift between a first position and a second position within the fluid flow path to control flow of fluid through the fluid flow path. The linkage may operatively connect the control element and/or a valve stem to the diaphragm. The first chamber of the actuator may be operatively coupled with the fluid outlet to be hydraulically connected to an outlet fluid pressure at the fluid outlet, whereby the diaphragm is responsive to changes in the outlet fluid pressure. The second chamber may be hydraulically coupled with ambient atmosphere.

Additional optional aspects and features are disclosed, which may be arranged in any functionally appropriate manner, either alone or in any functionally viable combination, consistent with the teachings of the disclosure. Other aspects and advantages will become apparent upon consideration of the following detailed description.

DETAILED DESCRIPTION

Figure 1:
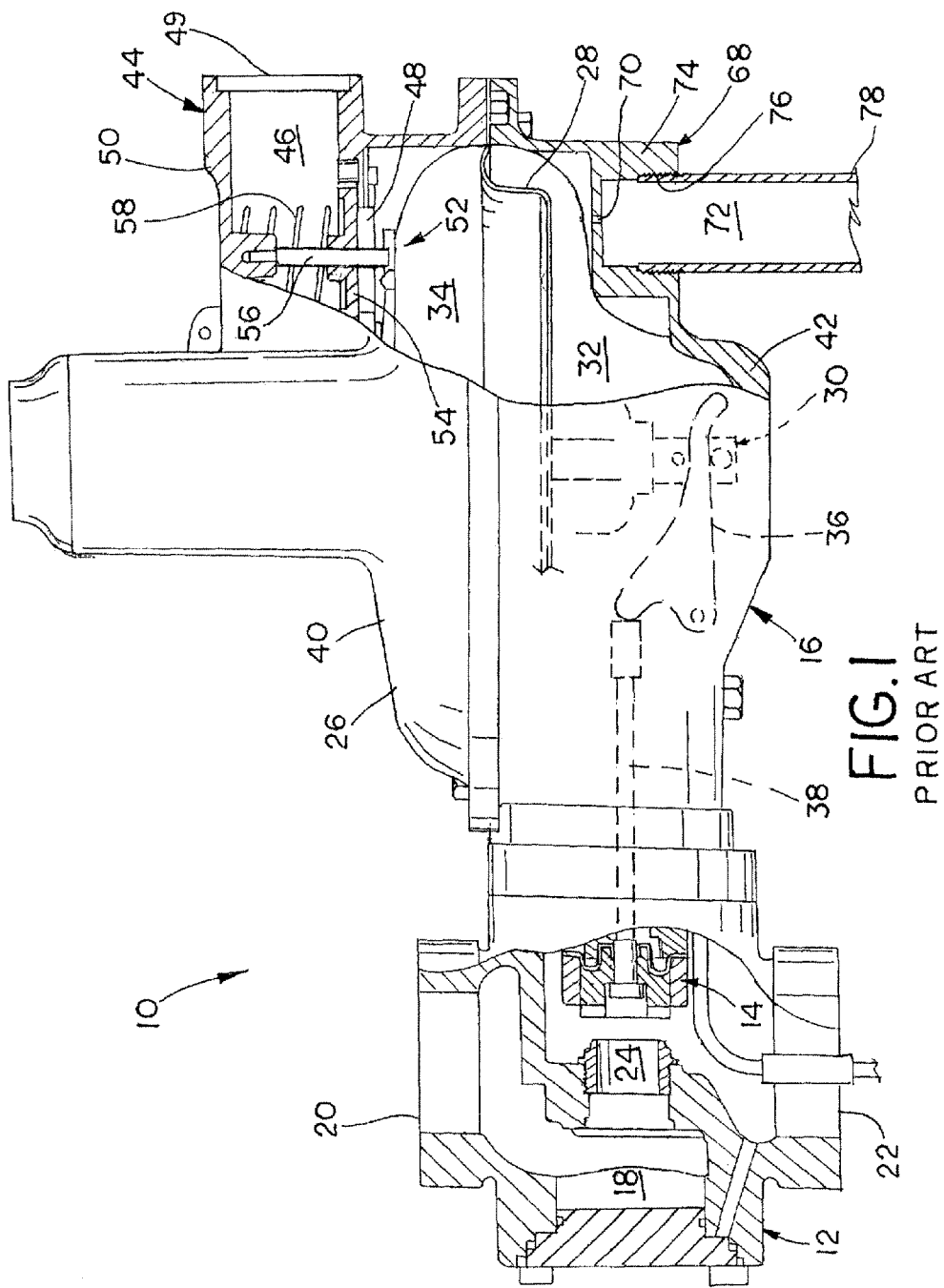
FIG. 1 is a side view in partial cut-away of a fluid regulator of the prior art.
Figure 2:
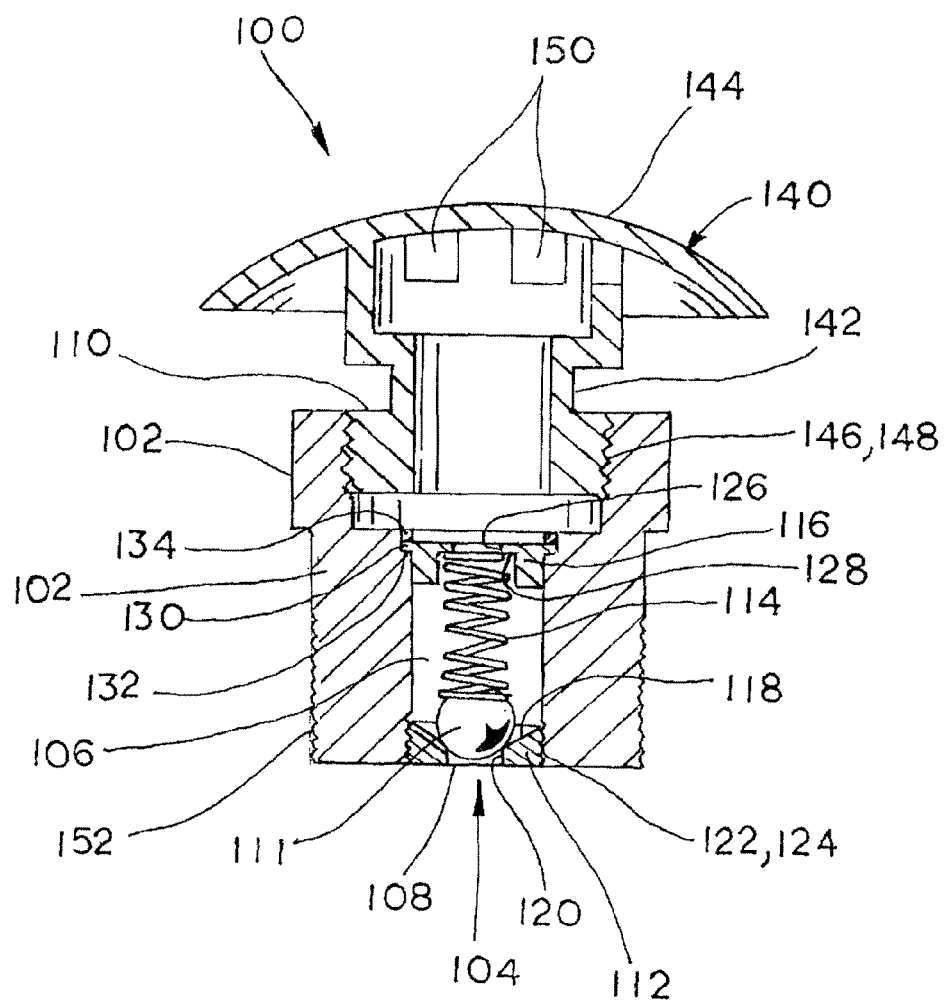
FIG. 2 is a cross-sectional view of a damper according to the present disclosure.

Turning now to the present disclosure, FIG. 2 shows a damper 100 for an actuator, such as the actuator 16 on the fluid regulator 10. The damper 100 includes a sleeve 102 and a ball check valve 104 operatively carried by the sleeve 102. The sleeve 102 defines a bore 106 extending from an inlet 108 to an outlet 110. The ball check valve 104 is arranged to allow fluid, such as air or water, to travel through the bore 106 from the inlet 108 to the outlet 110 when a minimum backpressure is reached on the inlet side of the ball check valve 104.

The ball check valve 104 includes a flow control member in the form of a ball 111, a valve seat 112, a spring 114, and a spring seat 116. The valve seat 112 is disposed in the bore 106, preferably at the inlet 108 of the bore 106. The spring seat 116 is disposed in the bore 106 spaced apart from the valve seat 112 toward the outlet 110. The ball 111 is shiftably disposed in the bore 106. The ball 111 releasably sealingly engages the valve seat 112 and is arranged to shift between a closed position seated against the valve seat 112 and an open position spaced away from the valve seat 112. The spring 114 is positioned to bias the ball 111 toward the valve seat 112 and arranged to allow the ball 111 to shift to the open position when fluid pressure at the inlet 108 exceeds a threshold pressure, or set point pressure, to thereby vent fluid pressure through the bore 106 to the outlet 110. The spring 114 is disposed in the bore 106 between and engaging against the ball 111 and the spring seat 116. The spring 114 biases the ball 111 against the valve seat 112 in a normally closed position. The spring 114 allows the ball 111 to disengage from the valve seat 112 in response to increased backpressure at the inlet 108 when the backpressure exceeds the set point pressure resulting from a spring force of the spring 114. When the pressure at the inlet 108 falls below the set point pressure, the spring 114 resiliently urges the ball 111 back into engagement with the valve seat 112. Thus, the ball check valve 104 allows fluid to pass through the bore 106 from the inlet 108 to the outlet 110 and prevents fluid from passing the opposite direction through the bore 106 from the outlet 110 to the inlet 108.

The valve seat 112 has a body that is disposed in the inlet 108 to the bore 106. The body has in inner side facing into the bore 106 toward the spring seat 116 and an outer side facing out of the inlet 108. The valve seat 112 includes a bleed aperture 120 extending from the outer side to the inner side, and a seating surface 118 disposed on the inner side surrounding the bleed aperture 120. The seating surface 118 is adapted to sealingly engage the ball 111 and preferably is formed by a recessed surface sized to partly receive the ball 111, such as a recessed frustoconical surface, disposed on an inner side of the valve seat 112.

The spring seat 116 has a body disposed in the bore 106. The body has in inner side facing the valve seat 112 and an outer side facing the outlet 110, at least one bleed bore 126 extending through the body from the inner side to the outer side, and a seating surface 128 on the inner side. The seating surface 128 is formed by a protruding surface, such as an inner annular shoulder in the bleed bore 126 disposed inside the bleed bore 126. The seating surface 128 is adapted to provide a seating surface against which the spring 114 seats. Additional or alternative air passageways may also be defined through the spring seat 116 to provide additional or alternative bleed passageways.

In one arrangement, one or both of the valve seat 112 and the spring seat 116 is integral with the sleeve 102.

In another, separable arrangement, one or both of the valve seat 112 and the spring seat 116 is a separate component from the sleeve 102 that is removably coupled to the sleeve 102, for example, by being mounted, either permanently or releasably, into the bore 106. In this separable arrangement, the body of the valve seat 112 is in the form of a plug having an outer peripheral wall extending between the outer side and the inner side, the bleed aperture 120 extends through the plug, and the valve seat is releasably mounted in the bore 106, for example, by outer threads 122 on the outer peripheral wall that engage inner threads 124 carried by the sleeve 102 at the inlet 108 to the bore 106, a bayonet connection, a snap-fit connection, or other type of releasable mounting connection. In this, separable arrangement, the valve seat 112 may be one of several interchangeable different size valve seats 112 adapted to be mounted in the bore 106, each size valve seat 112 having different arrangements, such as different diameter, length, and/or shape bleed apertures 120 and/or seating surfaces 118, wherein each different size valve seat 112 can be interchangeably mounted in the bore 106. For example, a first size valve seat 112 may have a bleed aperture 120 having a first diameter, and a second size valve seat 112 may have a bleed aperture 120 having a second bleed diameter different than the first bleed diameter. The spring seat 116 has a body in the form of a plug or disk permanently or releasably mounted in the bore 106. The spring seat 116 has an outer peripheral wall extending from the inner side to the outer side of the body that engages the inner peripheral surface of the bore 106. The spring seat 116 may be releasably mounted in the bore 106 by any sufficient mechanism. In the exemplary mechanism, the outer peripheral wall includes an annular projection or lip 130, the bore 106 includes an inner annular shoulder 132, the lip 130 engages against the annular shoulder 132, and a snap ring 134 is adapted to releasably lock the spring seat 116 into engagement against the annular shoulder 132. However, other mechanisms may also or alternatively be used, such as a threaded connection, a bayonet connection, a snap-fit connection, and/or other locking mechanisms. The spring seat 116 may be one of several different interchangeable size spring seats 116 adapted to be mounted in the bore 106, each size spring seat 116 having different arrangements, such as different diameter, length, number and/or shape of bleed apertures 126, wherein each different size spring seat 116 can be interchangeably mounted in the bore 106. For example, a first size spring seat 116 may have a bleed aperture 126 having a first diameter, and a second size spring seat 116 may have a bleed aperture 126 having a second bleed diameter different than the first bleed diameter. In the separable arrangements, the spring 114 may also be interchangeable with other sized springs 114. For example, a first size spring 114 having a first spring rate may be interchangeable with a second size spring 114 having a second spring rate different than the first spring rate. The ball 111 may also be interchangeable with other sized balls 111. For example a first size ball 111 having a first diameter may be interchangeable with a second size ball 111 having a second diameter different than the first diameter.

With the separable arrangements, a system for customizing the damper 100 with interchangeable components may be provided, such as by an operator in the field or at a field shop, wherein the system includes a sleeve 102 and one or more interchangeable balls 111, valve seats 112, springs 114 and/or spring seats 116 of different sizes and/or configurations as described herein. With the system, an operator may select a size of the ball 111, the valve seat 112, the spring 114, and/or the spring seat 116, to obtain a selected backpressure and assemble the damper 100 by mounting the selected valve seat 112, spring 114, and/or spring seat 116 into the sleeve 102. The backpressure created by the damper 100 into the respective chamber 32 and/or 34, i.e., the set point pressure, may be selectably adjusted to be larger or smaller by selecting a particular combination of the different sized balls 111, spring seats 112, springs 114, and valve seats 116. Thus, interchanging any one of the first and second sized balls 111, first and second sized valve seats 112, first and second sized spring seats 116, and first and second sized springs 114 results in changing the backpressure the damper 100 produces as fluid passes through the ball check valve 104.

A protective cover 140 may optionally be mounted to the damper 100. The protective cover 140 is adapted, for example, to prevent rain and/or debris from entering into the bore 106 while also allowing fluid to exhaust from the outlet 110. The protective cover 140 includes a neck 142 having a first end and a second end and a shield 144 disposed at the second end. The neck 142 mounts into the outlet 110 of the bore 106 and has a hollow bore extending from the first end to the second end. The neck may releasably mount into the sleeve with, for example, outer threads 146 at the first end of the neck 142 that engage inner threads 148 formed by the sleeve 102 adjacent the outlet 110. The shield 144 is in the form of a cover, such as a flat plate or curved bowl, that covers the second end of the hollow bore. One or more vent apertures 150 through the neck 142 are arranged to allow air exhausting from through the bore 106 of the damper 100 to exhaust though the protective cover 140 to atmosphere. The vent apertures 150 are disposed adjacent an underside of the shield 144, preferably within a recess formed in the underside of the shield 144. The shield 144 prevents or limits rain and/or debris from passing through the vent apertures 150 and into the bore 106 of the damper 100.

Outer threads 152 are optionally disposed on an outer peripheral surface of the sleeve 102. The outer threads 152 are disposed at the inlet end of the sleeve 102 and may be used to mount the sleeve into a reciprocally threaded socket as discussed hereinafter.

Figure 3:
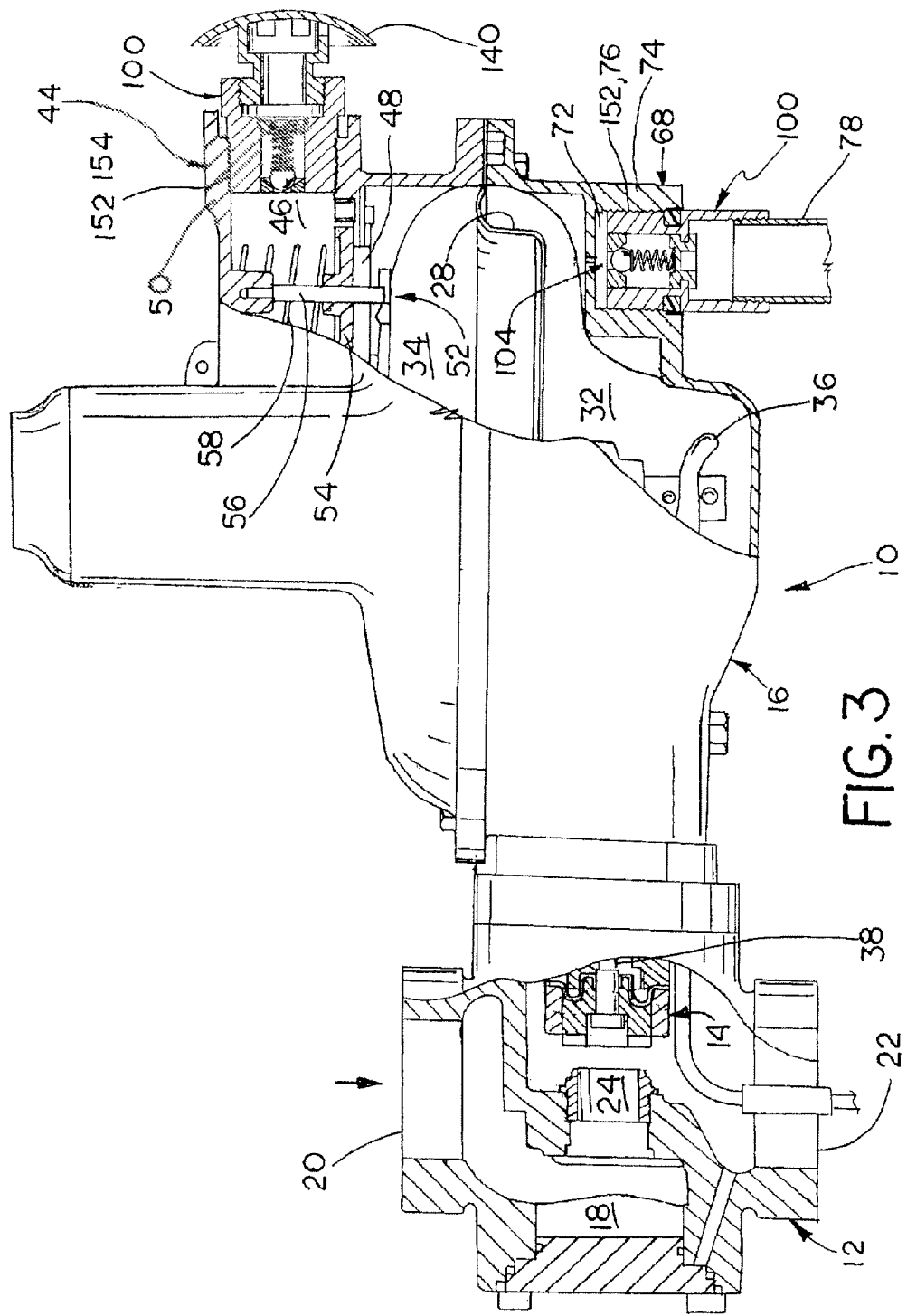
FIG. 3 is a side view in partial cut-away of a fluid regulator having a damped actuator including dampers according to the present application.

Turning now to FIG. 3, the damper 100 is shown installed as part of the actuator 16 of the fluid regulator 10 previously described herein, thereby modifying the actuator 16 into a damped actuator. The damper 100 is optionally operatively coupled to either or both of the exhaust vent 44 and the control vent 68, for example, by operatively coupling the sleeve 102 to the vent opening of the exhaust vent 44 and/or the control vent 68.

At the exhaust vent 44, for example, the damper 100 is mounted, preferably releasably, in the bore 46, for example by reciprocal inner threads 154 at the outlet 59 of the bore 46 that engage the outer threads 152 of the sleeve 102. Thus, the actuator 16 includes the stabilizer valve 52 and the damper 100 to provide additional damping of oscillations. Further, the damper 100 may be retrofitted to an existing actuator and/or fluid regulator, such as the actuator 16 and fluid regulator 10, by installing the damper 100 into the exhaust vent 44 without taking the fluid regulator 10 out of service. The damper 100 may be selected from a plurality of dampers 100 that are pre-assembled having different sizes or backpressure set points, and/or the ball 111, valve seat 112, spring 114, and/or the spring seat 1116 of the damper 100 may be selected and mounted to the sleeve 102 to provide a selected backpressure set point as described herein before. The protective cover 140 is optionally mounted to the sleeve 102 as previously described to prevent rain and/or debris from entering and possibly fouling the ball check valve 104.

At the control vent 68, the damper 100 is mounted, preferably releasably, in the socket 72, for example by threaded engagement between the inner threads 76 at the second end of the sleeve 74 and the outer threads 152 of the sleeve 102. In this arrangement, the protective cover 140 is not mounted to the sleeve 102. Rather, the conduit 78 is connected to the sleeve 102, for example, by threaded engagement of the inner threads 146 to reciprocal outer threads at the end of the conduit 78. Similar to the damper 100 disposed in the exhaust vent 44, the damper 100 disposed in the control vent 68 may be custom selected and/or modified to provide one of several selected characteristics, such as a minimum backpressure set point, flow capacity, and the like.

Other components of the fluid regulator 10 are identical as previously described and known in the art, and are not repeated here, but reference is made to such description. However, the damper 100 may be used in combination with other types and styles of fluid regulators and/or actuators in accordance with the present disclosure. Thus, the disclosure is not limited to the specific type, style, or size of the fluid regulator and/or actuator described herein, it being understood that the particular type of fluid regulator and actuator described herein are exemplary only.

A method of modifying an actuator of the prior art, such as the actuator 16, to include one or more of the dampers 100. For example, in a first step, a damper 100 is selected and/or customized to provide one of a plurality of different backpressure set points as described previously herein. Thereafter, the damper 100 is mounted at the exhaust vent 44 or the control vent 68 so as to control the flow of fluid through the respective vent. Preferably, the sleeve 102 of the damper 100 is mounted into the respective vent 44 and/or 68, for example, by engaging the threads 152 to the threads 76 or 154.

Each of the optional arrangements described herein may be arranged in any set of combinations or permutations sufficient to provide any combination of one or more functionalities suggested by the description provided herein. Further, it is understood that each of the features disclosed with respect to each exemplary arrangement may be combined in any functional combination, such as to provide any useful combination of functionalities as would be understood by a person of ordinary skill.

The damper 100 may be useful in some arrangements to provide additional damping to a fluid regulator and/or actuator. The damper 100 may be useful in some arrangements to allow a fluid regulator and/or actuator to be field adjusted in a way to reduce and/or control oscillation or flutter of the diaphragm and/or the control element. Other uses and/or benefits not listed herein may also or alternatively be provided by these and/or other arrangements of the damper, actuator, and/or fluid regulator disclosed herein.

Numerous modifications to the damper, actuator, and/or fluid regulator disclosed herein will be apparent to those skilled in the art in view of the foregoing description. Accordingly, this description is to be construed as illustrative only and is presented for the purpose of enabling those skilled in the art to make and use the invention and to teach the preferred mode of carrying out same. The exclusive rights to all modifications within the scope of the disclosure and the appended claims are reserved.

I claim:

1. A method of modifying an actuator for a fluid regulator, the actuator comprising an actuator housing, a diaphragm, a linkage, and a vent opening formed in the actuator housing, the diaphragm disposed in the actuator housing and separating the actuator housing into a first chamber and a second chamber, the linkage operatively connected to the diaphragm and arranged to be operatively connected to a valve stem, the first chamber hydraulically connected to a fluid outlet of a regulator body to sense a fluid pressure at the fluid outlet, and the vent defining an air exhaust path out of the second chamber to surrounding ambient atmosphere, wherein the method comprises steps of:
   providing a damper comprising a ball check valve; and
   operatively installing the damper to the vent while the fluid regulator is in service to sense a fluid pressure at the fluid outlet without taking the fluid regulator out of service so as to control flow of air exhausted through the vent, wherein the ball check valve is arranged to allow air to exhaust from the second chamber through the vent when air pressure within the chamber exceeds a set point pressure and to prevent air from entering the second chamber through the vent.

2. The method of claim 1, wherein the step of operatively installing includes securing the damper in the vent.

3. The method of claim 2, wherein the damper further comprises a sleeve, and the ball check valve is disposed in the sleeve, the step of operatively installing further comprising the step of inserting the sleeve into the vent.

4. The method of claim 3, wherein the step of operatively installing comprises releasably coupling the sleeve to the vent.

5. The method of claim 4, wherein the step of operatively installing comprises threadedely engaging the sleeve to the vent.

6. The method of claim 1, wherein the damper comprises:
   a sleeve including a bore;
   a valve seat disposed within the bore;
   a ball shiftably disposed in the bore, the ball arranged to shift from a closed position seated against the valve seat to an open position disposed away from the valve seat; and
   a spring positioned to bias the ball toward the valve seat, the spring arranged to allow the ball to shift to the open position when fluid pressure within the second chamber exceeds a threshold pressure to thereby vent fluid pressure from the second chamber; and
   wherein operatively installing the damper to the vent comprises operatively coupling the sleeve to the vent opening.

7. The method of claim 6, wherein the sleeve defines an inlet, an outlet, and the bore extends from the inlet to the outlet, wherein a spring seat is disposed in the bore spaced apart from the valve seat toward the outlet, and the spring is disposed in the bore between the ball and the spring seat.

8. The method of claim 7, wherein the valve seat comprises a body that can be removably coupled to the sleeve, and wherein providing a damper comprises removably coupling the body of the valve seat to the sleeve.

9. The method of claim 7, wherein the spring seat comprises a body that can be removably coupled to the sleeve, and wherein providing a damper comprises removably coupling the body of the spring seat to the sleeve.

10. The method of claim 7, wherein the spring comprises a coil spring having a first end and a second end, the first end engaging the ball, and the second end engaging the spring seat.

11. The method of claim 7, further comprising a protective cover operatively covering the outlet.

12. The method of claim 1, and the actuator further comprising:
   a stabilizer valve disposed in the vent between the damper and the first chamber.

* * * * *

UNITED STATES PATENT AND TRADEMARK OFFICE
CERTIFICATE OF CORRECTION

PATENT NO. : 9,662,752 B2
APPLICATION NO. : 14/953603
DATED : May 30, 2017
INVENTOR(S) : Jason S. Mevius Page 1 of 1

It is certified that error appears in the above-identified patent and that said Letters Patent is hereby corrected as shown below:

In the Specification

At Column 1, Line 8, "2012," should be -- 2012, now Pat. No. 9,234,599, --.

At Column 1, Line 66, "a the" should be -- the --.

At Column 2, Line 67, "threadedely" should be -- threadedly --.

At Column 3, Line 58, "though" should be -- through --.

At Column 7, Line 57, "though" should be -- through --.

At Column 8, Line 22, "spring seat 1116" should be -- spring seat 116 --.

At Column 8, Line 35, "inner threads 146" should be -- inner threads 148 --.

In the Claims

At Column 10, Line 7, "threadedely," should be -- threadedly --.

Signed and Sealed this
Thirty-first Day of July, 2018

Andrei Iancu
*Director of the United States Patent and Trademark Office*